US012511502B2

United States Patent
Brown, III et al.

(10) Patent No.: US 12,511,502 B2
(45) Date of Patent: Dec. 30, 2025

(54) RFID TAG READERS SWITCHABLE BETWEEN INTERROGATOR AND LISTENER MODES

(71) Applicant: Automaton, Inc., San Diego, CA (US)

(72) Inventors: Thomas A. Brown, III, Raleigh, NC (US); Joe Mueller, San Diego, CA (US); Adam Blair, San Diego, CA (US); Spencer Hewett, New York, NY (US); Prokopios Panagiotou, Seal Beach, CA (US)

(73) Assignee: Automaton, Inc., San Diego, CA (US)

( * ) Notice: Subject to any disclaimer, the term of this patent is extended or adjusted under 35 U.S.C. 154(b) by 301 days.

(21) Appl. No.: 18/556,541

(22) PCT Filed: Apr. 25, 2022

(86) PCT No.: PCT/US2022/026198
§ 371 (c)(1),
(2) Date: Oct. 20, 2023

(87) PCT Pub. No.: WO2022/226410
PCT Pub. Date: Oct. 27, 2022

(65) Prior Publication Data
US 2024/0193381 A1 Jun. 13, 2024

Related U.S. Application Data

(60) Provisional application No. 63/178,832, filed on Apr. 23, 2021.

(51) Int. Cl.
*G01S 13/76* (2006.01)
*G01S 13/08* (2006.01)
(Continued)

(52) U.S. Cl.
CPC .......... *G06K 7/10237* (2013.01); *G01S 13/08* (2013.01); *G01S 13/84* (2013.01)

(58) Field of Classification Search
None
See application file for complete search history.

(56) References Cited

U.S. PATENT DOCUMENTS

| 7,419,096 B2 | 9/2008 | Esterberg et al. |
| 10,013,860 B2 | 7/2018 | Hewett |

(Continued)

FOREIGN PATENT DOCUMENTS

| EP | 3608827 A1 * | 2/2020 | ......... G06K 7/10475 |
| WO | WO-2008097701 A1 * | 8/2008 | ......... G06K 19/0723 |

(Continued)

OTHER PUBLICATIONS

International Search Report and Written Opinion Mailed Jul. 13, 2022 in International Application No. PCT/US2022/026198 11 pages.

(Continued)

*Primary Examiner* — Mohammed Rachedine
(74) *Attorney, Agent, or Firm* — Smith Baluch LLP (57) ABSTRACT

Radio-frequency identification (RFID) systems use readers to query and locate passive RFID tags in stores, warehouses, and other environments. A signal from the reader powers up the tag, which modulates and backscatters the signal toward the reader. Unfortunately, the maximum permitted RF signal power, self-interference at the reader, tag sensitivity, and channel loss limit the range at which readers can detect and locate tags. Using multiple readers simultaneously circumvents these limits. When used together, each reader transmits a signal to a tag in turn, and all of the readers listen for each of the tag's responses. The readers that are not transmitting do not experience self-interference and so can detect (Continued)

responses at lower power levels (longer ranges). Because the readers are at different locations, they measure different angles of arrival (AOAs) for each response. These simultaneous measurements can be used to locate each tag faster and with higher fidelity.

39 Claims, 8 Drawing Sheets

(51) Int. Cl.
*G01S 13/82* (2006.01)
*G01S 13/84* (2006.01)
*G01S 13/87* (2006.01)
*G06K 7/10* (2006.01)

(56) References Cited

U.S. PATENT DOCUMENTS

| | | | |
|---|---|---|---|
| 10,386,474 | B2 | 8/2019 | Hewett |
| 10,505,663 | B2 | 12/2019 | Kummetz et al. |
| 10,572,703 | B1 | 2/2020 | Shyamkumar et al. |
| 10,860,819 | B1 | 12/2020 | Pesavento et al. |
| 10,871,558 | B2 | 12/2020 | Hewett |
| 10,956,693 | B1 | 3/2021 | Shyamkumar et al. |
| 10,959,047 | B2 | 3/2021 | Sauer |
| 11,043,093 | B2 | 6/2021 | Hewett |
| 11,215,691 | B2 | 1/2022 | Hewett et al. |
| 11,408,965 | B2 | 8/2022 | Hewett et al. |
| 11,543,512 | B2 | 1/2023 | Hewett |
| 11,915,567 | B2 | 2/2024 | Hewett |
| 11,933,877 | B2 | 3/2024 | Hewett |
| 12,013,474 | B2 | 6/2024 | Hewett et al. |
| 12,117,548 | B2 | 10/2024 | Hewett et al. |
| 12,164,048 | B2 | 12/2024 | Hewett et al. |
| 2005/0285742 | A1* | 12/2005 | Charych ............ G06K 17/00 340/572.1 |
| 2006/0145813 | A1 | 7/2006 | Haller et al. |
| 2008/0094212 | A1 | 4/2008 | Breed |
| 2013/0076568 | A1* | 3/2013 | Shoarinejad ............ G01S 13/06 342/463 |
| 2015/0139439 | A1 | 5/2015 | Norris et al. |
| 2019/0018101 | A1* | 1/2019 | Sadr ................... G06K 7/10366 |
| 2021/0199747 | A1 | 7/2021 | Hewett et al. |
| 2021/0199748 | A1 | 7/2021 | Hewett et al. |
| 2021/0304576 | A1 | 9/2021 | Hewett |
| 2022/0069460 | A1* | 3/2022 | Bloy .................... H01Q 1/2208 |
| 2022/0082651 | A1 | 3/2022 | Hewett et al. |
| 2023/0130857 | A1 | 4/2023 | Hewett |
| 2024/0046211 | A1 | 2/2024 | Hewett et al. |
| 2024/0273986 | A1 | 8/2024 | Hewett |
| 2024/0295623 | A1 | 9/2024 | Hewett et al. |
| 2024/0302522 | A1 | 9/2024 | Hewett |
| 2024/0330614 | A1 | 10/2024 | Mueller et al. |
| 2024/0330619 | A1 | 10/2024 | Morse et al. |
| 2024/0386375 | A1 | 11/2024 | Dhar et al. |

FOREIGN PATENT DOCUMENTS

| | | | | |
|---|---|---|---|---|
| WO | WO-2019232420 | A2 * | 12/2019 | ............ H04W 4/025 |
| WO | WO-2020146012 | A1 * | 7/2020 | ............ G07G 1/009 |
| WO | 2022226351 | A2 | 10/2022 | |
| WO | 2022226410 | A1 | 10/2022 | |
| WO | 2023278652 | A1 | 1/2023 | |
| WO | 2023114976 | A1 | 6/2023 | |
| WO | 2023147585 | A2 | 8/2023 | |
| WO | 2023212698 | A1 | 11/2023 | |
| WO | 2023240088 | A2 | 12/2023 | |
| WO | 2023240296 | A1 | 12/2023 | |
| WO | 2023250401 | A1 | 12/2023 | |
| WO | 2024196837 | A1 | 9/2024 | |

OTHER PUBLICATIONS

Extended European Search Report in European Appl. No. 22792646.6 dated Jan. 24, 2025, 5 pages.

* cited by examiner

Sensor Measurements

Channel Monitor & Channel Monitoring and Selection Process

RFID TAG READERS SWITCHABLE BETWEEN INTERROGATOR AND LISTENER MODES

CROSS-REFERENCE TO RELATED APPLICATION(S)

The present application is a national-stage application, under 35 U.S.C. 371, of International Application No. PCT/US2022/026198, filed on Apr. 25, 2022, which claims the priority benefit, under 35 U.S.C. 119 (e), of U.S. Application No. 63/178,832, filed on Apr. 23, 2021. Each of these applications is incorporated herein by reference in its entirety for all purposes.

BACKGROUND

A radio-frequency identification (RFID) tag reader, also called an RFID tag interrogator or simply a reader, is a device that communicates with RFID tags. A typical reader includes one or more antennas for transmitting radio-frequency (RF) signals to RFID tags and receiving RF replies from the RFID tags. Some readers include one antenna for transmitting and another antenna or set of antennas for receiving the replies. The signal attenuation of the cables connecting the receive antenna(s) to the reader can limit the distance between the controller and the receive antenna(s) to about two meters (six feet) or less.

The maximum distance or range between the antenna(s) and the RFID tag depends on the maximum power of the RF signal transmitted by the reader, the maximum power of the tag's reply, the loss in the communications channel between the reader and the RFID tag, the sensitivity of the reader, and the sensitivity of the RFID tag. The maximum power of the RF signal from the reader is usually limited by a government regulatory body to prevent interference with other wireless devices. In the United States, the Federal Communications Commission (FCC) limits the maximum conducted power of RF signals transmitted by RFID tag readers to about 30 dBm (1 W). (The antenna can have up to 6 dBi gain such that the radiated power is 36 dBi.) A passive RFID tag typically reflects or back-scatters about 10% of the incident power in the RF signal from the reader as its reply. This efficiency translates to a loss of about 10 dB. If one-way channel loss is 40 dB due scattering, reflections, and/or attenuation, then the signal power reaching the RFID tag would be about 30 dBm (plus 6 dBi antenna gain) less 40 dB due to path loss for a total of −10 dBm (−4 dBm if including the 6 dBi antenna gains), which is 10 dB above the typical RFID tag's turn-on threshold of −20 dBm. If the RFID tag re-radiates about 10% of the incident power (a 10 dB loss), then the power level of the RFID tag's reply that reaches the reader is about −60 dBm (1 nW), neglecting antenna gain. If the reader's sensitivity is −70 dBm and the desired signal-to-noise ratio (SNR) is 10 dB, then the reader should be able to detect and decode the RFID tag's reply.

The round-trip channel loss generally increases with range, so achieving a greater range generally involves some combination of increasing the transmitted signal power, increasing the tag back-scattering efficiency and sensitivity, increasing the antenna gain (and possibly steering the beam from the reader), and improving the reader sensitivity. Unfortunately, the FCC limits the maximum signal power transmitted to the tag (and hence the amount of power available for the tag's reply) and thermal noise fundamentally limits the reader sensitivity. In addition, the transmission from the reader overlaps in time with the tag's response, necessitating self-interference cancellation of the transmission from the reader in order to detect the tag's response. (Self-interference cancellation typically involves canceling leakage (the signal traveling directly from the transmitter into the receiver within the reader) and local reflections and compensating for harmonics and noise generated by non-linearities in the amplifiers, mixers, and other transmitter components.) With some conventional systems, FCC regulations on maximum transmitted power and path loss limit the maximum achievable range from a reader to a passive RFID tag to about 15 meters.

SUMMARY

A faster, more efficient system for locating RFID tags includes a plurality of sensors and a controller operably coupled to each sensor in the plurality of sensors. The plurality of sensors includes at least first and second sensors, which may be about 5 meters to about 10 meters apart from each other. The first and second sensors can be switched independently between interrogator and sensor modes. The first sensor is switched into the interrogator mode and begins transmitting a carrier wave (CW). After a period long enough to power up the RFID tags within range, the first sensor transmits one or more commands to one or more of the RFID tags and detects a first reply emitted by one of the RFID tags in response to a first command. The second sensor, operating in listener mode, detects and decodes the first command. From the decoded command, the second sensor determines that it should expect a first reply to the first command from an RFID tag as well as parameters for decoding the first reply. The second sensor then detects and decodes the first reply. Generally, the second sensor is in listener mode from the start of the hop in order to detect and lock onto the CW of the interrogator. As a listener, the second sensor both listens to and decodes the interrogator commands so that it can listen to the tag's replies those commands solicited by the interrogator commands. And the controller switches the first sensor into the interrogator mode and estimates a location of the RFID tag relative to the first sensor and the second sensor based on the first reply as detected separately by the first and second sensors.

Each sensor in the plurality of sensors may be configured to detect the first reply and to calculate a corresponding angle of arrival (AOA) of the first reply, in which case the controller can triangulate the location of the RFID tag based on the corresponding AOAs. Each sensor can also measure a distance or range to the RFID tag based on the first reply (e.g., based on the first reply's amplitude or received signal strength indicator (RSSI)). Using trilateration, the controller can estimate the RFID tag's location from the distance and range from different sensors can be used, we can use trilateration.

The first and second sensors can be mounted on a ceiling, with the first sensor configured to transmit the first command downward, and the second sensor configured to detect the first command as scattered or reflected by an object below the first sensor. Alternatively, the first sensor may be a handheld RFID tag reader and the second sensor may be mounted on a ceiling. The first sensor can emit the first command in a first (spectral) channel in a plurality of channels, in which case the second sensor can monitor each channel in the plurality of channels and detect the first reply on the first channel in response to detecting the first command on the first channel.

The first sensor may include a transmitter to generate the first command and a receiver to detect the first reply and commands from other sensors. The receiver includes a receiver front end, a first demodulator, and a second demodulator. In operation, the receiver front end receives the first reply and receives queries from other sensors in the plurality of sensors. The first demodulator, which is operably coupled to the receiver front end, demodulates to the first reply, optionally with a Viterbi decoder. And the second demodulator, which is operably coupled to the receiver front end, demodulates the queries from the other sensors in the plurality of sensors. The transmitter can be switched into an inactive mode when the first sensor is in the listener mode. The receiver front end may include a channel monitor to monitor channels over which the other sensors transmit queries. This channel monitor can monitor 50 channels spanning a band of 40 MHz and having bandwidths of 500 kHz each.

The second sensor can enter the listener mode in response to a command from the controller or another device. It can also emit a second command and detect a second reply emitted by the RFID tag in response to the second command, in which case the first sensor can detect the second command and the second reply and the controller can estimate the location of the RFID tag based on the second reply as detected by the first sensor and as detected by the second sensor. The second sensor can detect the first command via a non-line-of-light (NLOS) path between the first sensor and the second sensor.

The controller can be coupled to each sensor in the plurality of sensors via a wired connection of a wired communications network. This wired communications network may have a latency greater than a time between transmission of the first command by the first sensor and transmission of the first reply by the RFID tag. The controller can command the first sensor to transmit the first command and command the second sensor to transmit a second command according to a schedule. The first and second sensors may each determine and transmit a duration, frequency, received power (received signal strength indicator), angle of arrival, and/or another signature of the first reply to the controller.

In some cases, each sensor in the plurality of sensors is switchable between the interrogator mode and the listener mode. In these cases, the controller may switch the sensors in the plurality of sensors between the interrogator mode and the listener mode in a round-robin fashion. The first sensor may perform phase estimation of the tag reply in interrogator mode and perform both phase estimation and frequency estimation of the tag reply in listener mode.

A system for locating RFID tags can include sensors, which can be mounted on or from a ceiling, and a controller, which is operably coupled to the sensors. Each sensor can be switched between an interrogator mode in which it transmits commands to the RFID tags and receives replies to the commands from the RFID tags and a listener mode in which it receives and decodes the commands from other sensors and the replies from the RFID tags. The sensors can estimate respective angles of arrival of the replies from the RFID tags and/or respective ranges to the RFID tags. The controller can switch the sensors between the interrogator and listener modes. It can also estimate the locations of the RFID tags from the respective angles of arrivals (e.g., using triangulation) and/or the respective ranges (e.g., using trilateration). For instance, the controller can switch the sensors into the interrogator mode in a round-robin fashion such that one sensor is in the interrogator mode and all of the other sensors are in the listener mode at a time.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1A:
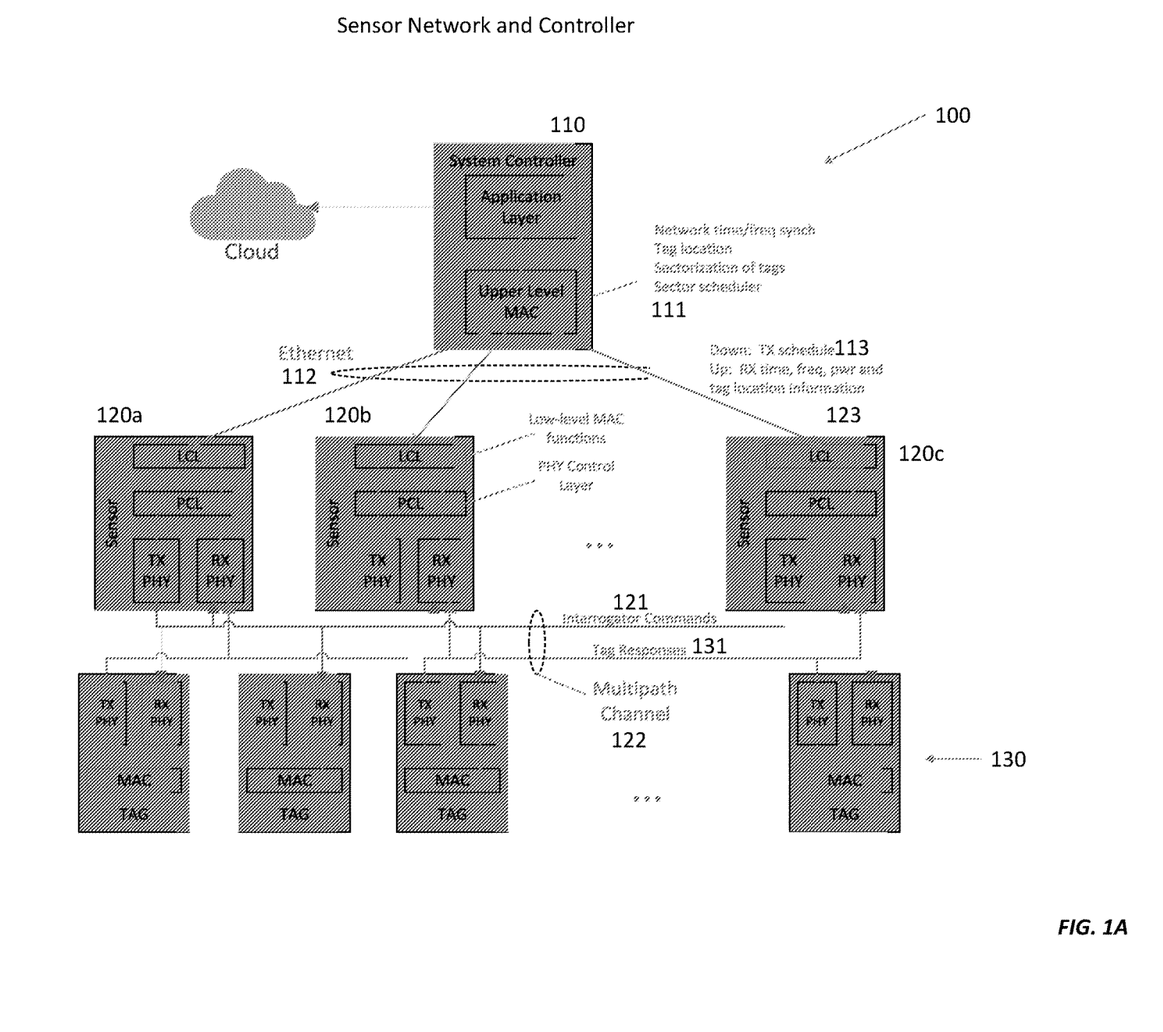
FIG. 1A shows an RFID tag location system with a central controller coupled to a set of RFID tag sensors, each of which can be switched between interrogator and listener modes, via an Ethernet local area network (LAN).
Figure 1B:
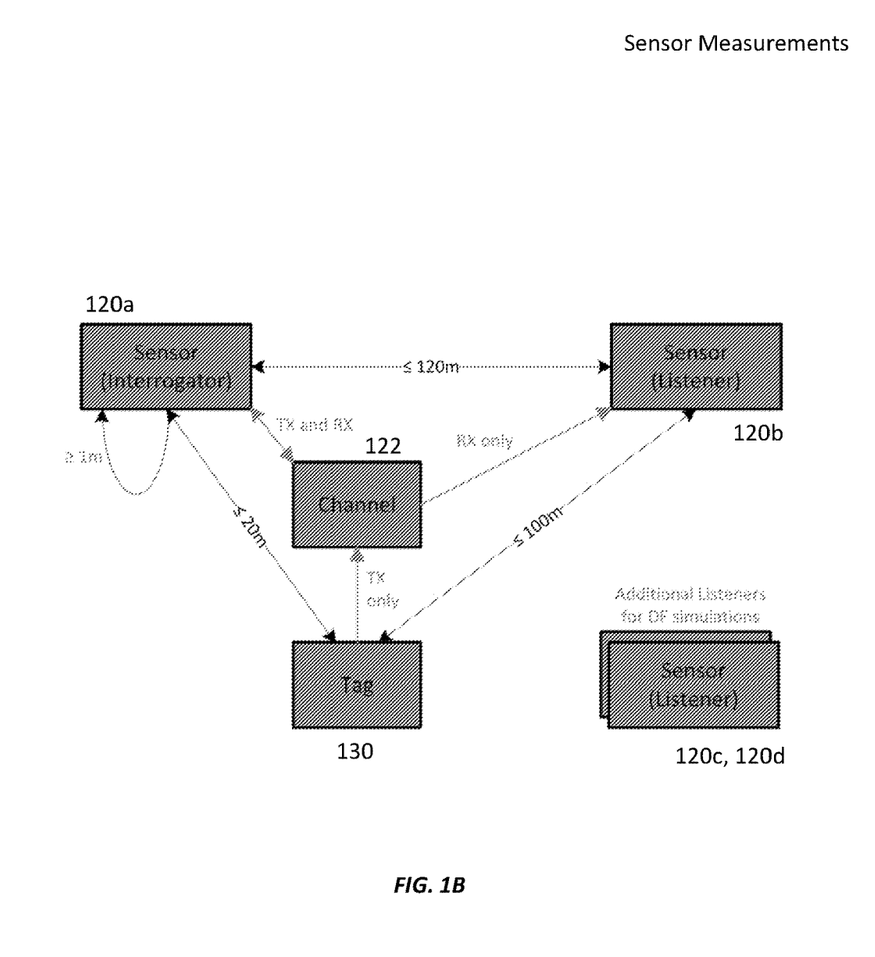
FIG. 1B illustrate how sensors in interrogator and listener modes can trigger and detect replies from a passive RFID tag.
Figure 1C:
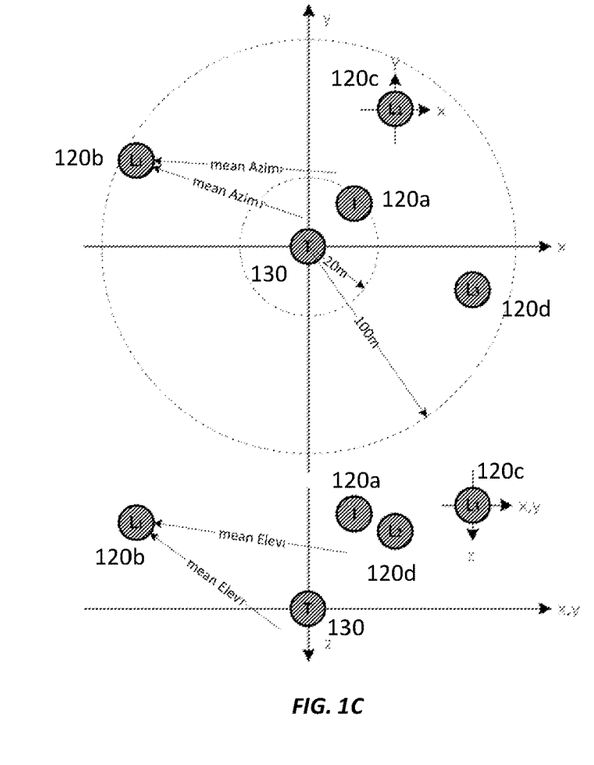
FIG. 1C illustrates angle-of-arrival (AOA) measurements made with one sensor in interrogator mode and other sensors in listener mode.

FIGS. 1A-1C illustrate an RFID tag location system 100 that locates one or more RFID tags 130 with several RFID tag readers 120a-120d (collectively, readers 120) that can be switched between an interrogator mode and a listener or receive-only mode. Typically, only one reader 120 is in interrogator mode at a time while one or more of the other readers 120 are in listener mode. The reader 120 that is in interrogator mode interrogates a tag 130, and it and all of the readers 120 in listener mode within range receive the tag's reply. For N readers 120, this means making up to N measurements of the tag's reply simultaneously even though only one reader 120 may be transmitting an interrogation message at a time. This N-fold increase in the number of simultaneous measurements can be used to increase the speed (e.g., by a factor of N), fidelity (e.g., by a factor of √N through incoherent averaging), or speed and fidelity of the RFID tag location performed by the system 100.

Making many simultaneous measurements, by readers at different locations, of each reply offers several advantages over using conventional techniques, which involve measuring the AOA or range from only one reader at a time. To start, the system can use these different measurements to estimate the tag's location in two or three dimensions from a single reply instead of the multiple replies and serial measurements from different readers needed by a conventional RFID tag location system. For environments with high tag densities and many sensors (readers), this can cut the location measurement time by tens of seconds to minutes, which is how long it can take a second or third sensor to read a tag.

For some applications, this location refresh rate may not be sufficient. Consider, for example, estimating the location of a moving tag. If the tag moves between successive AOA or range measurements made one reader at a time, then triangulation or trilateration based on these measurements will produce an erroneous result. In contrast, using sensors at different location to make multiple AOA and/or range measurements simultaneously eliminates these errors caused by tag movements.

Making simultaneous measurements from different locations is also more efficient than making sequential measurements, one sensor at a time. In a conventional system, a first reader or sensor reads a tag (e.g., by using the random slotted ALOHA method if the tags are unknown or by the Select RFID protocol procedure to read specific known tags). After the first sensor reads the tag, a second sensor close to the first sensor uses the Select command to re-read the same tag and obtain a second AOA or distance measurement. If the second reader does not read the tag successfully or the range or AOA estimate is poor, a third sensor may repeat the measurement. This is inefficient because the tag is being read multiple times; if the tag is in motion, this may affect the quality of the location estimate due movement during the time between reads. Conversely, multiple simultaneous measurements involve a single read of the tag, eliminating the delay between reads and the extra commands (here, the Select commands sent by the second and subsequent readers).

The readers 120 may make more simultaneous measurements in a round-robin fashion, with each reader 120 serving as the interrogator in turn while the other readers 120 act as listeners, further increasing measurement speed and/or fidelity. Because the listeners are not powering the tags, and hence do not suffer from self-interference, etc., they can detect tag responses at much greater ranges, making it possible to make measurements from distances/locations that are simply not possible with conventional systems.

The readers 120 are connected to a system controller 110 via respective Ethernet connections 112 or other suitable (usually wired) connections as shown in FIG. 1A. The Ethernet connections 112 may connect the readers 120 to each other as well. The system controller 110 has a clock synchronized to network time and uses that clock to synchronize the readers 120 via the Ethernet connections 112. The readers 120 should be synchronized well enough that when different readers 120 time-stamp the received replies from the same tag 130 sent at the same time, the system controller 110 can group and process the detected replies together. The synchronization should also be good enough to prevent excessive time between hops (e.g., allowing a minimum inter-hop spacing of 1 millisecond or more).

This synchronization may reveal that the latency of one or more of the Ethernet connections 112 and/or the variation in latency among the Ethernet connections 112 exceeds the allotted window or inter-hop spacing for an RFID tag 130 to respond to an interrogation signal or command 121 from a reader 120, making it impractical for the readers 120 to communicate with each other about scheduling via the wired connections 112. If these latencies are larger than the allotted tag reply window/inter-hop spacing, then the readers 120 may simply detect the broadcast commands 121 instead of sensing separate signals about the commands 121 to each other via the wired connections 112. The readers 120 can also communicate with each other wirelessly (e.g., over the same RF channel used for communicating with the tags 130) using reader-specific commands instead of via the local area network provided by the Ethernet connections 112.

The system controller 110 also includes a processor that generates a schedule 113 for interrogating the RFID tags 130. The schedule 113 lists the time(s) at which each reader 120 is supposed to be in interrogator mode and in listener mode. That is, the schedule 113 lists when each reader 120 is supposed to emit interrogation signals 121, including queries and other interrogator commands. The schedule 113 may also list windows when each reader 120 should expect to receive interrogation signals 121 from other readers 120 and tag replies prompted by those interrogation signals 121. The system controller 110 transmits this schedule 113 to the RFID tag readers 120 via the Ethernet connections 112. It stores the schedule 113 in a local memory coupled to the processor. The system controller 110 receives tag reply data 123, including receive time, frequency, power, and tag location information, from the RFID tag readers 120 and stores this data 123 in the memory too for later processing.

The readers 120 broadcast interrogation signals 121 according to the schedule 113, with each reader 120 in either interrogator mode or listener mode. Typically, one reader 120 is in interrogator mode at a time, with the other readers 120 in listener mode. When the reader 120 in interrogator mode broadcasts the interrogation signal 121, the tags 130 receive the interrogation signal 121 via a wireless, multipath channel 122 through the store, warehouse, factory, or other environment in which the system 100 is deployed. At least one of the tags 130 responds to the interrogation signal 121 with a tag reply 131 that arrives at the reader 120 in interrogation mode within a predefined time window after the interrogation signal 121. The readers 120 in listener mode detect the interrogation signal 121 and tag reply 131 over the same wireless, multipath channel 122. The tag reply 131 as detected by the different readers 120 can be used to locate the tag 130 faster and/or more precisely than is possible with conventional RFID tag location systems.

The entire interrogation/reply sequence is called a hop and is described in greater detail below. Each hop begins with a period of continuous carrier wave (CW) transmission at a single frequency. This CW transmission powers the RFID tag 130. Whenever a sensor or reader 120 transmits a command, it modulates this CW with the command and then returns to transmitting the continuous CW. The durations of the unmodulated and modulated portions of the hop depend on the RFID protocol and/or country; in the United States, a hop is typically 400 msec and commands range in duration from about 100 μsec to about 1 msec or longer depending on the selected Type A Reference Interval (TARI; e.g., 6.25 μsec to 25 μsec) and the number of payload bits in the command.

FIGS. 1B and 1C illustrate how the RFID tag location system 100 can be used to make multiple angle-of-arrival (AOA) measurements of a single tag reply 131 at the same time for faster and/or more accurate tag location measurements. In this case, the readers 120 are arrayed on the ceiling of a room, such as a room in a retail store or warehouse. There may be tens to hundreds of readers 120 in the environment. Each reader 120 is separated from its nearest neighbor by up 120 meters (e.g., by 5, 10, 15, 20, 25, 30, 40, 50, 60, 70, 80, 90, 100, 110, or 120 meters) and is connected to the controller (not shown) via an Ethernet or other wired or wireless connection. The distance separating each pair of readers 120 may be based on the maximum range for powering a tag 130, e.g., if the maximum range for powering a tag 130 is 10 meters, then the readers 120 may be up to 20 meters apart from each other so that each tag can be powered by at least one reader. Each reader 120 is oriented so that its antenna(s) emits interrogation signals 121 largely downward, toward the floor, with less RF energy propagating sideways.

In this example, reader 120a is in interrogator mode and readers 120b-120c are in listener mode. Reader 120a transmits an interrogation signal 121 via a free-space channel 122, which could include one or more reflections, to the RFID tag 130. Reader 120a should be close enough to the tag 130, which is passive, for the interrogation signal 121 to power or charge the tag 130 enough to produce a detectable reply 131. Given constraints on maximum power, channel loss, and tag backscattering efficiency, the distance between the RFID tag 130 and reader 120a should be about 20 meters or less (e.g., 15, 10, or 5 meters). The other readers 120b-120d can be farther away from the tag 130 (e.g., up to 25, 50, 75, 100, 125, 250, or even 500 meters away) because they are not powering or charging the tag 130 and hence do not suffer from self-interference. Given constraints on maximum power, channel loss, and tag backscattering efficiency as well as self-interference cancellation, the distance between the RFID tag 130 and reader 120a may be about 20 meters or less (e.g., 15, 10, or 5 meters).

The other readers 120b-120d can be farther away from the tag 130 (e.g., up to 25, 50, 75, or even 100 meters away) because they are not powering or charging the tag 130, so they do not have to perform self-interference cancellation in order to detect the response 131. The maximum distance between the other readers 120b-120d and the tag 130 depends on the amplitude of the reply 131, the channel loss, and the sensitivity of the readers 120 and can be up to 500 meters with the right receiver, antenna, and path-loss conditions. (The amplitude of the tag reply response is generally 10 dB below its turn-on power, which is typically around −17 dBm (and decreasing over time as tag performance improves). The channel loss is around 32 dB at 1 meter and increases by about 6 dB for every doubling of distance. The sensitivity of a reasonable RFID receiver is −80 dBm.) The readers 120 may be arrayed within the room so that every reader 120 should be able to detect replies from every tag 130 or so that not every reader 120 can detect replies from every tag 130, depending in part on the shape and size of the room.

The tag 130 may have a dipole antenna that radiates the reply 131 in a donut-shaped pattern. Because the readers 120 are at different locations with respect to the tag 130, this RF field impinges each reader 120 from a different azimuth and/or elevation as shown at top and bottom, respectively, of FIG. 1C. In certain circumstances, such as if the channel between the reader 120a and the tag 130 is reverse-link limited, the listeners 120b-120d can receive the tag's reply 131 without error even if the reader 120a receives the reply 131 with error. Each reader 120 can calculate the corresponding azimuth and elevation AOAs and transmit the calculated AOAs for each tag 130 to the controller 110. Each reader 120 can also estimate the range or distance to tag 130 based on the amplitude or RSSI of the reply 131 The controller 110 may aggregate the AOAs and/or ranges from the different readers 120 and use them to estimate the tag's location, e.g., by trilateration or triangulation. Because a single interrogation signal 131 yields multiple simultaneous AOA measurements from different locations by up to all of the readers 120 in the system 100, the controller 110 can derive or estimate the location of the RFID tag 130 after just one hop, unlike in conventional RFID systems, which may take many hops to locate a tag 130 in two or three dimensions. With more AOA measurements, the controller can estimate the tag's location relative to the readers 120 more precisely. If the readers' absolute locations are known, the controller 110 can use them to estimate the tag's absolute location as well.

Readers 120b-120d also detect the interrogation signal 121 from reader 120a before detecting the tag reply 131. As explained in greater detail below, when a reader 120 is in listener mode, it scans the relevant RFID communication band (e.g., 902 to 928 MHz in the United States or 865 to 868 MHz in Europe) for the interrogation signal 121, which may be broadcast on one of many channels (e.g., 50 channels) within that band. When a reader 120 in listener mode detects an interrogation signal 121 on a particular channel, it listens for a reply 131 on the same channel within a predetermined or preset time window of the end of the interrogation signal 121. The reader 120 may also demodulate or decode the interrogation signal 121 and use the decoded interrogation signal 121 to interpret the reply 131 from the tag 130.

The interrogation signal 121 tells the tag 130 how to respond (i.e., the modulation, preamble-type, and bit rate for the reply 123). The readers 120 in listener mode listen for the commands 121 to know how the tag 130 should respond to the command 121. The readers 120 in listener mode also determine the end-time of the command 121 to know when to expect the tag reply 123 based on the timing constraints placed on the tag's reply 123.

Because the readers 120 are mounted on the ceiling and broadcast interrogation signals 131 downward (toward tags 130), they generally detect the interrogation signals 131 from other readers 120 via non-line-of-sight (NLOS) paths. In FIGS. 1B and 1C, for example, reader 120a emits the interrogation signal 131 downward, causing at least a portion of the signal 131 to reflect or scatter off the floor, shelving, and/or other objects. The other readers 120b-120d detected this reflected or scattered energy, possibly instead of or in addition to detected energy that propagates directly from reader 120a without scattering or reflecting off another surface. Even accounting for attenuation along the NLOS path, the detected interrogation signal 131 has an amplitude great enough to be detected with high fidelity (e.g., SNR>10 dB) by the readers 120b-120d in listener mode.

The RFID tag location system 100 can also include or interact with handheld readers, vehicle- or cart-mounted readers, or other readers that are not connected to the system controller 110 via a wired connection. These readers may be switchable between interrogator and listener modes or they may be conventional readers that operate exclusively as interrogators, i.e., by transmitting interrogation signals and receiving tag replies without detecting or processing interrogation signals from other readers. In either case, when a handheld reader transmits an interrogation signal, the readers that are both in listener mode and within range detect both that interrogation signal and any tag replies. These readers may compute the estimated AOA of the tag reply and the location of the responding tag from the tag replies and report the locations, AOA, and/or tag reply parameters (e.g., magnitude, phase, time of arrival) to the system controller for more processing.

If desired, the handheld reader may broadcast a command to the other (fixed) readers that switches the other readers into listener mode before transmitting the interrogation signal. Alternatively, the other readers can scan the RFID channels for handheld readers when not transmitting or in interrogator mode. Or the readers (including the handheld reader) can use a self-synchronizing PN sequence to drive the frequency hopping such that all readers (fixed and/or handheld) can synchronize to the hopping pattern. The fixed readers could also always be in listener mode (and possibly lack transmitters and associated hardware) for operation exclusively with handheld or mobile readers (interrogators).

Figure 2:
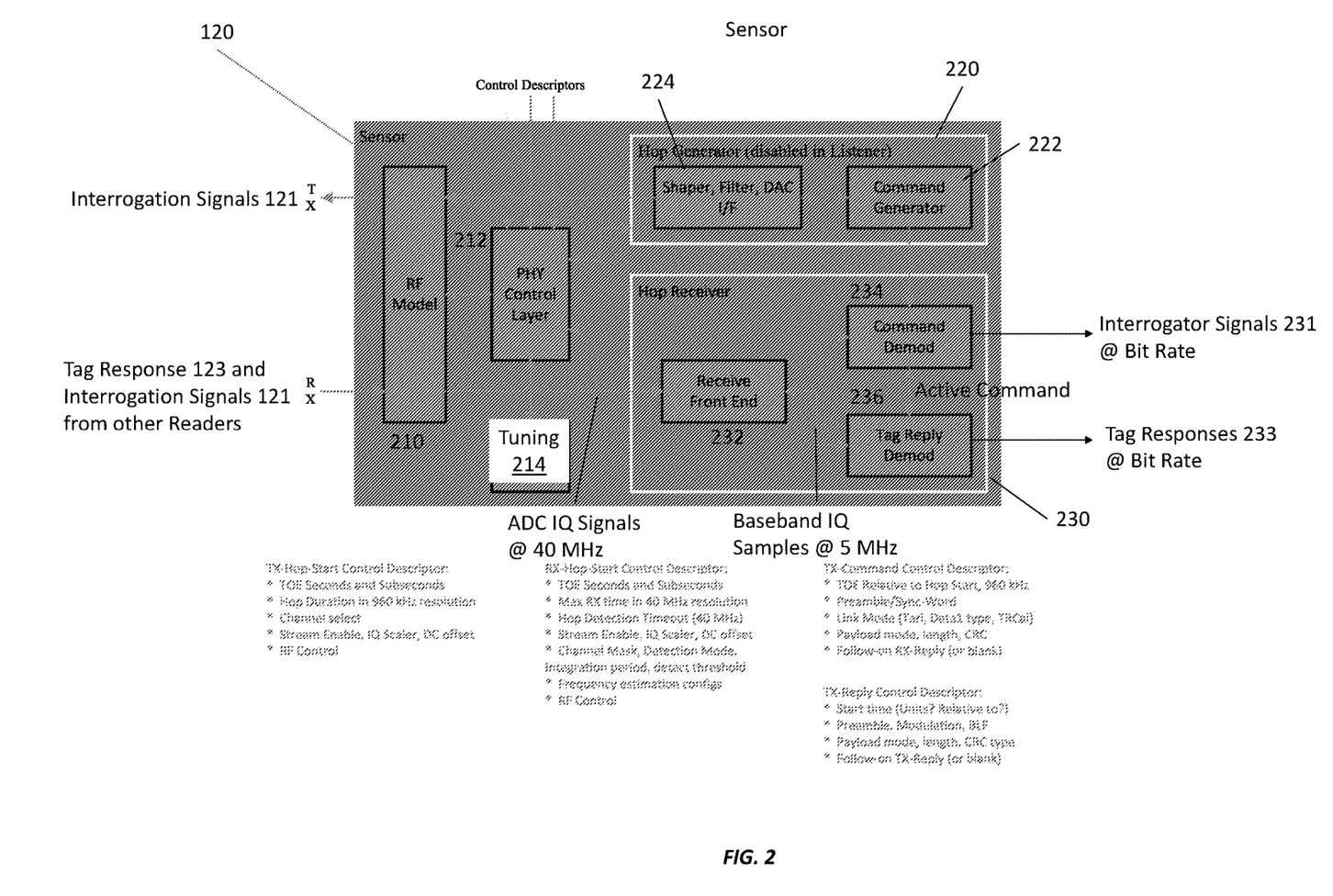
FIG. 2 shows an RFID tag sensor that can be switched between interrogator and listener modes.

FIG. 2 illustrates the reader 120 in greater detail, including components that can be enabled if the reader 120 is in interrogator mode or disabled if the reader 120 is in listener mode. The reader 120 includes an RF antenna and front end 210, a processor 212, an RF calibration and tuning block 214, a hop generator 220, and a hop receiver 230. The RF antenna and front end 210 may include one or more antenna elements, amplifiers, filters, and/or other analog RF components for transmitting RFID interrogation signals 121 and receiving tag replies 131 and RFID interrogation signals 121 from other readers. The processor 212 may be implemented in a microcontroller, application-specific integrated circuit (ASIC), field-programmable gate array (FPGA) or other suitable device and controls the operation of the reader 120. It stores information in and retrieves information from a memory (not shown) and communicates with the system controller via a network connection (not shown), such as an Ethernet connection. And the processor 212 switches the reader 120 between interrogator and listener modes, with the hop generator 220 being disabled or off in interrogator mode and enabled or on in interrogator mode and the hop receiver 230 being enabled or on in both modes. The RF calibration and tuning block 214 performs RF calibration and tuning functions.

The hop generator 220 generates the interrogation signals 121 that the reader 120 transmits to the RFID tags 130 and other readers 120 (FIGS. 1A-1C). It may also generate commands or communications signals intended for other readers 120, e.g., on a dedicated reader communications channel or with particular preambles or payloads. It includes a digital command generator 222, which generates the digital queries, commands, and/or other information conveyed by the interrogation signals 121, and RF electronics 224 for turning the digital signals from the command generator 222 into analog signals suitable for transmission by the antenna 210. The RF electronics 224 may include a digital-to-analog converter (DAC) that converts the digital signal into a baseband analog signal, a mixer and local oscillator to mix the baseband analog signal up to an intermediate frequency, and filters and/or pulse shapers to remove sidebands and/or spurs.

The hop receiver 230 includes a receiver front end 232 coupled to a command demodulator 234 and a tag reply demodulator 236. Generally, the receiver front end 232 digitizes, down-converts, and estimates the phase of the RF signals detected by the antenna(s). When the reader 120 is in listener mode, the receiver front end 232 also detects the channels on which the other readers 120 transmit interrogation signals 121 and estimates the carrier frequencies of those other interrogation signals 121. There are a variety of ways to configure the receiver front end 232; in this example, it receives analog in-phase and quadrature (I/Q) signals at 40 MHz and converts them into digital I/Q samples at baseband (5 MHz) as explained in greater detail below. In other examples, the receiver front end could include a low intermediate frequency heterodyne receiver or other suitable receiver. The command demodulator 234 is enabled when the reader 120 is in listener mode and demodulates the baseband command I/Q samples to produce interrogator signals 231 at the command bit rate (e.g., 40 kbps to 160 kbps). The command demodulator 234 uses the command payload to determine what the reader 120 in interrogator mode is asking of the tag 130 (e.g., modulation, preamble type, expected reply type, etc.). For example, the reader 120 in interrogator mode may ask the tag 130 to send the first 64 bits of its electronic product code (EPC) using Miller-2 modulation at a 320 kHz backscatter link frequency (BLF) with the standard preamble. The readers 120 in listener mode use that information to decode the tag reply 131. The command demodulator 234 is disabled when the reader 120 is in interrogator mode. The tag reply demodulator 236 is enabled in both interrogator and listener modes and demodulates the baseband tag reply I/Q samples to produce tag reply signals 233 at the tag reply bit rate.

Figure 3:
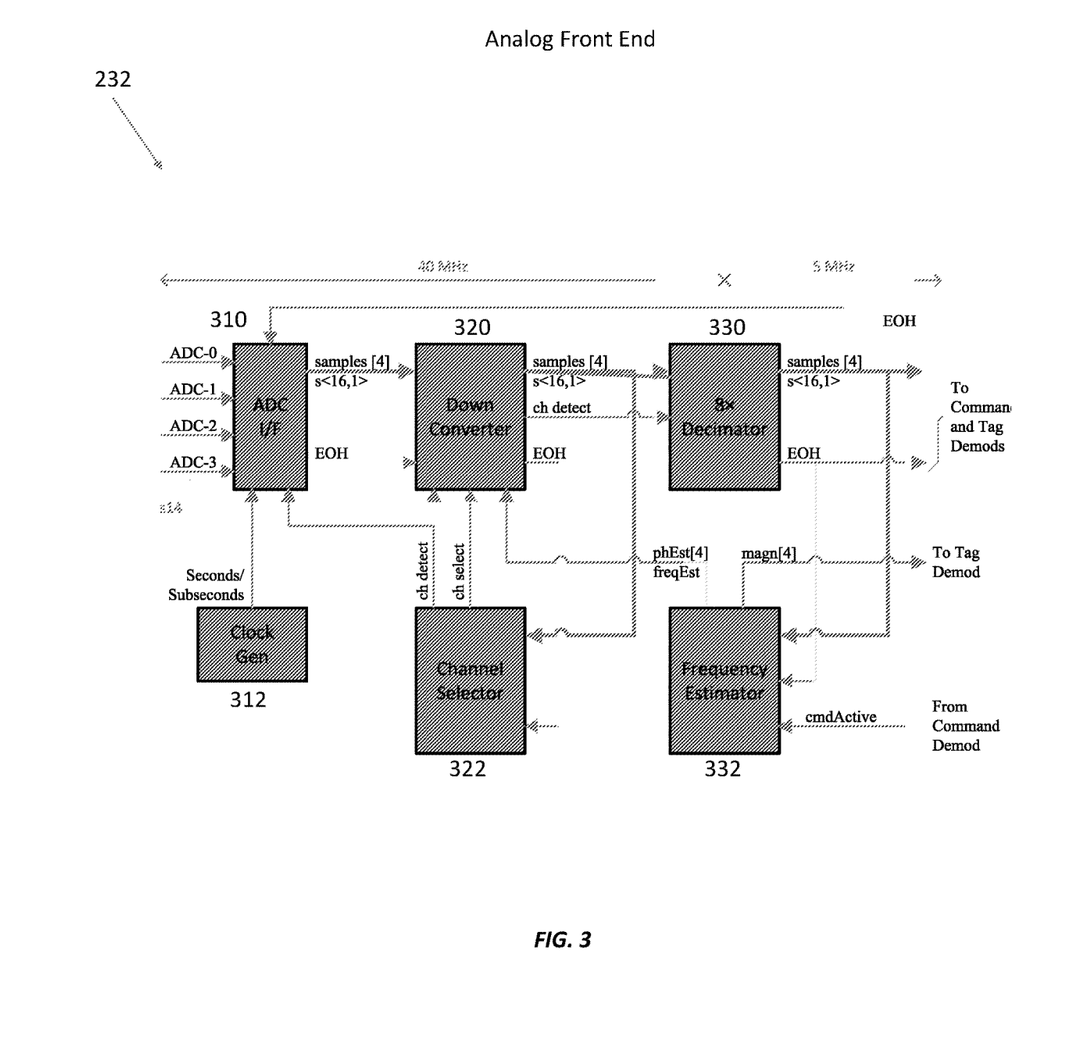
FIG. 3 shows a digital front end in an RFID tag sensor.

FIG. 3 shows one of many possible implementations of the receiver front end 232. This implementation includes an analog-to-digital converter (ADC) 310 that is clocked by a clock generator 312 and converts analog I/Q signals at 40 MHz on one or more channels into digital I/Q samples at 40 MHz. The ADC 310 also generates an end-of-hop (EOH) signal indicating the end of each hop. The EOH signal indicates that the reader 120 in listener mode can stop processing the current hop, and aggregate the hop statistics (e.g., power levels, time stamps of various events, etc.). The EOH signals that the receiver should prepare for the next hop or other next action, such as go idle or sleep.

A downconverter 320 coupled to the output of the ADC 310 mixes the digital I/Q samples down to baseband (e.g., 5 MSa/s). When the reader 120 is in listener mode, a channel detector and selector 322 detects and selects the channel of the detected interrogation signal 121 as described below. A decimator 330 down-samples the digital samples for processing by the command demodulator 234 and tag reply demodulator 236. In other words, once the receiver determines the 500 kHz channel of the received reply 123, it converts that channel to baseband and applies a baseband filter. It also down-samples the 40 MHz samples to 5 MHz to reduce the digital signal processing load.

In listener mode, a frequency estimator 332, which is enabled by the command demodulator 234, estimates the phase and frequency of the detected hop and provides these estimates to the downconverter 320, which compensates for frequency and phase, effectively removing both from the signal. The frequency estimator 332 also estimates the amplitude of the detected tag reply 131 and provides the amplitude estimate to the tag demodulator 236, e.g., for locating the RFID tag that sent the detected tag reply 131. This is a listener-only feature. In practice, the local clock references of the readers 120 may be different and may drift. The frequency estimator 332 makes it possible to track and remove the CW portion of the hop or at least remove enough of it so that a very narrow notch filter can remove any residual frequency offset. The readers 120 in listener mode may sense CW portions of the hop that are much larger than the tag reply 131 directly from the reader 120 in interrogator mode. The readers 120 in listener mode track and remove those CW portions to stay within the tag demodulator's dynamic range.

Figure 4A:
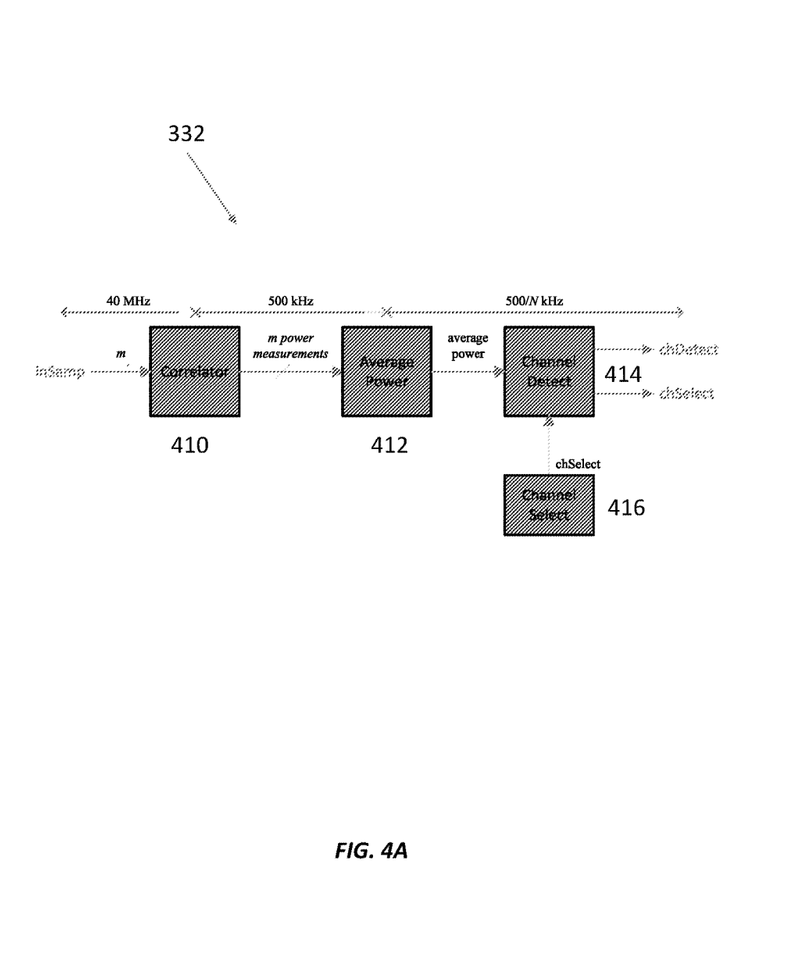
FIG. 4A illustrates selected components of a channel selector/spectrum analyzer in a digital front end for monitoring different channels for signals (e.g., queries or commands) from other RFID tag sensors.
Figure 4B:
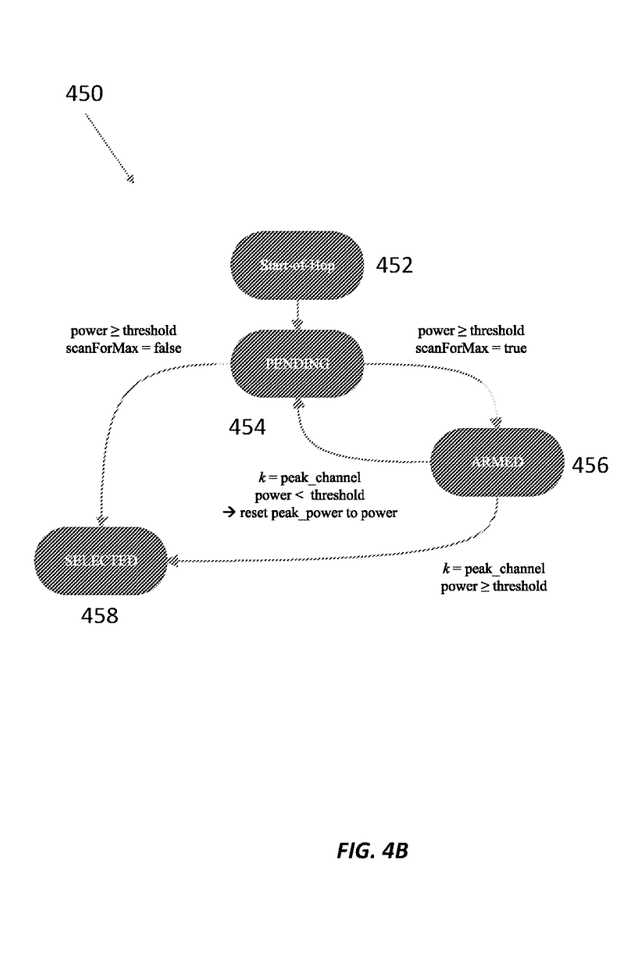
FIG. 4B illustrates a process for monitoring and selecting an RFID tag channel using the channel selector of FIG. 4A.

FIGS. 4A and 4B illustrate channel detection and selection. The channel detector and selector 322 can be implemented as a spectrum analyzer that scans the band over which the readers 120 transmit interrogation signals 121 and the passive RFID tags 130 backscatter replies 131. In this example, the channel detector and selector 322 includes a correlator 410, power meter 412, channel detector 414, and channel selector 416. The correlator 410 correlates the 40 MHz digital samples from the ADC 310 with the different channels (e.g., 50 channels), each of which has a total bandwidth of 500 kHz and supports a signal bandwidth of about 40-160 kHz, depending on the bit rate, leading to a tag reply signal bandwidth of 40-640 kHz, neglecting sidelobes. This can be accomplished by filtering the samples with a bank of bandpass filters, each at a different frequency, or by scanning a single bandpass filter or local oscillator across the entire band as in a scanning superheterodyne spectrum analyzer. The power meter 412 measures the average power in each channel over a predetermined period (e.g., the dwell time of the scanning filter). The channel detector 414 detects which channel has the highest average power, and the channel selector 416 selects that channel with the highest average power as the channel to monitor for a tag reply.

FIG. 4B illustrates a process 450 for channel monitoring, detection, and selection by a channel detector and selector 322 in a reader 120 in listener mode. When a hop starts (452), the correlator 410 and power meter 412 scan the RFID band for a channel with a received power exceeding a threshold power level (454). When the channel detector and selector 322 scans for the channel with the maximum power in a "scan-for-max" mode, it tests every channel (e.g., all 50 channels). When it finds the channel with the highest or maximum power, it transitions to an ARMED state (456) and then rescans the other channels to make sure that the current channel is truly the channel with the maximum power. After scanning the other channels without finding a higher power, it selects the channel with the maximum power, entering the SELECTED state (458). (If more than one channel has the maximum power, then the channel detector and selector 322 can pick the first or lowest-frequency channel.) The channel detector and selector 322 can also simply pick the first channel that exceeds a predetermined threshold power as the channel with the maximum power (i.e., as the selected channel). This threshold can be based on historical measurements of commands from other sensors. For example, if the reader is receiving a command from reader 120a and measured a power level of 1000 (arbitrary units) from reader 120a during a previous hop, the threshold may be set to 800. It is also possible to perform runtime calibrations in which each reader 120 measures the ambient noise when no readers 120 are transmitting and using the ambient noise floor (possibly with a bias, e.g., of 10 dB) as a threshold.

Figure 5A:
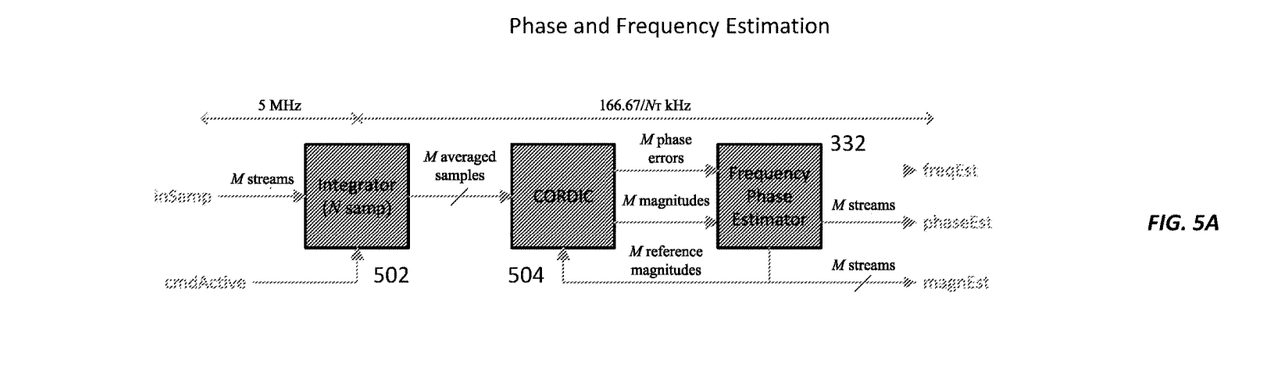
FIG. 5A illustrates a frequency and phase estimator that performs phase estimation for an RFID tag sensor in interrogator and listener modes and frequency estimation for an RFID tag sensor in listener mode.
Figure 5B:
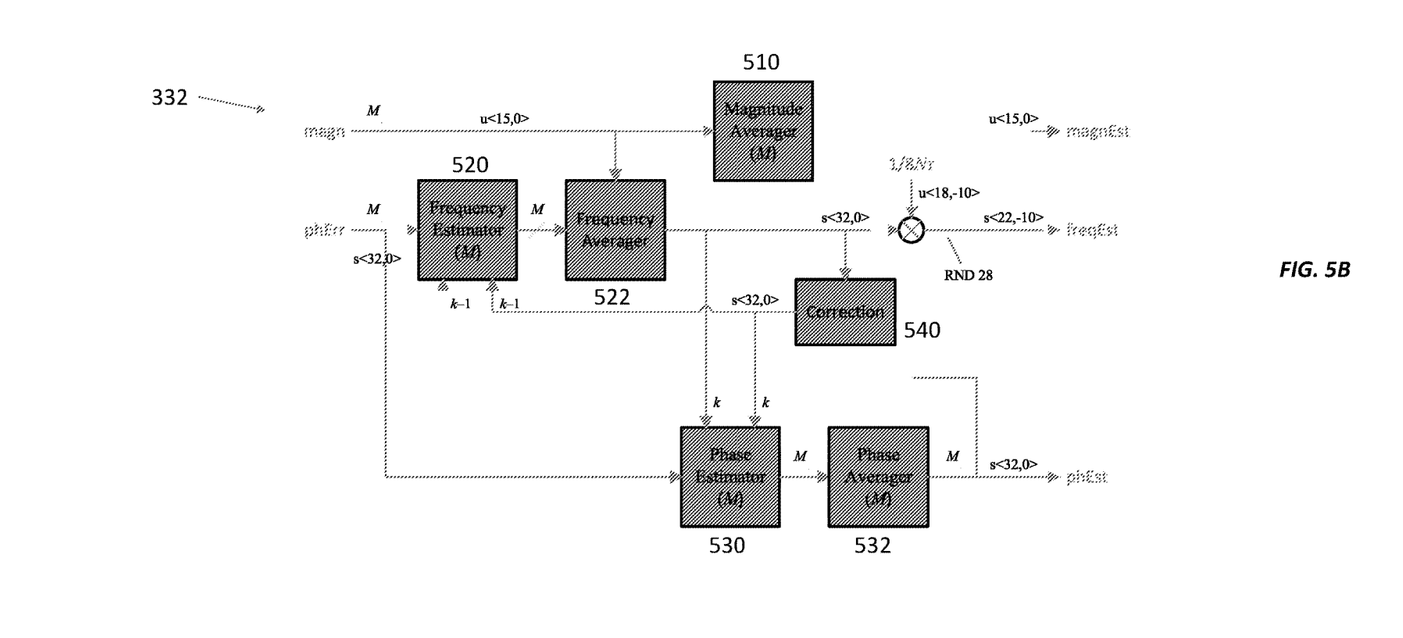
FIG. 5B illustrates frequency estimation for an RFID tag sensor in listener mode.

FIGS. 5A and 5B illustrate the operation of the frequency and phase estimator 332 in greater detail. As shown in FIG. 5A, an integrator 502 integrates N digital samples across each of M streams and provides the integrated/averaged samples to a Coordinate Rotation Digital Computer (CORDIC) chip 504 that determines the magnitude and phase error of each stream from the integrated/averaged samples. In listener mode, the frequency and phase estimator 332 estimates the frequency, phase, and magnitude of the received interrogator signal 121 and tag reply 131 from the magnitudes and phase errors of the M streams. These streams may be driven from the same oscillator (e.g., a voltage-controlled crystal oscillator (VXCO)) and so should be at the same frequency but may have different phases.

As shown in FIG. 5B, the frequency and phase estimator 332 includes a magnitude averager 510 that generates the magnitude estimate from the input magnitudes. A frequency estimator 520 estimates each stream's frequency from the corresponding phase error and feeds the results to a frequency averager 522, which averages the stream frequencies to produce an improved frequency estimate. Similarly, a phase estimator 530 estimates each stream's phase from the corresponding phase error and feeds the results to a phase averager 532, which averages the stream frequencies to produce the frequency estimate. The correction block 540 computes the correction factors to compensate for the implementation delays (e.g., delays between measuring and applying the frequency offset for sample n).

Figure 6:
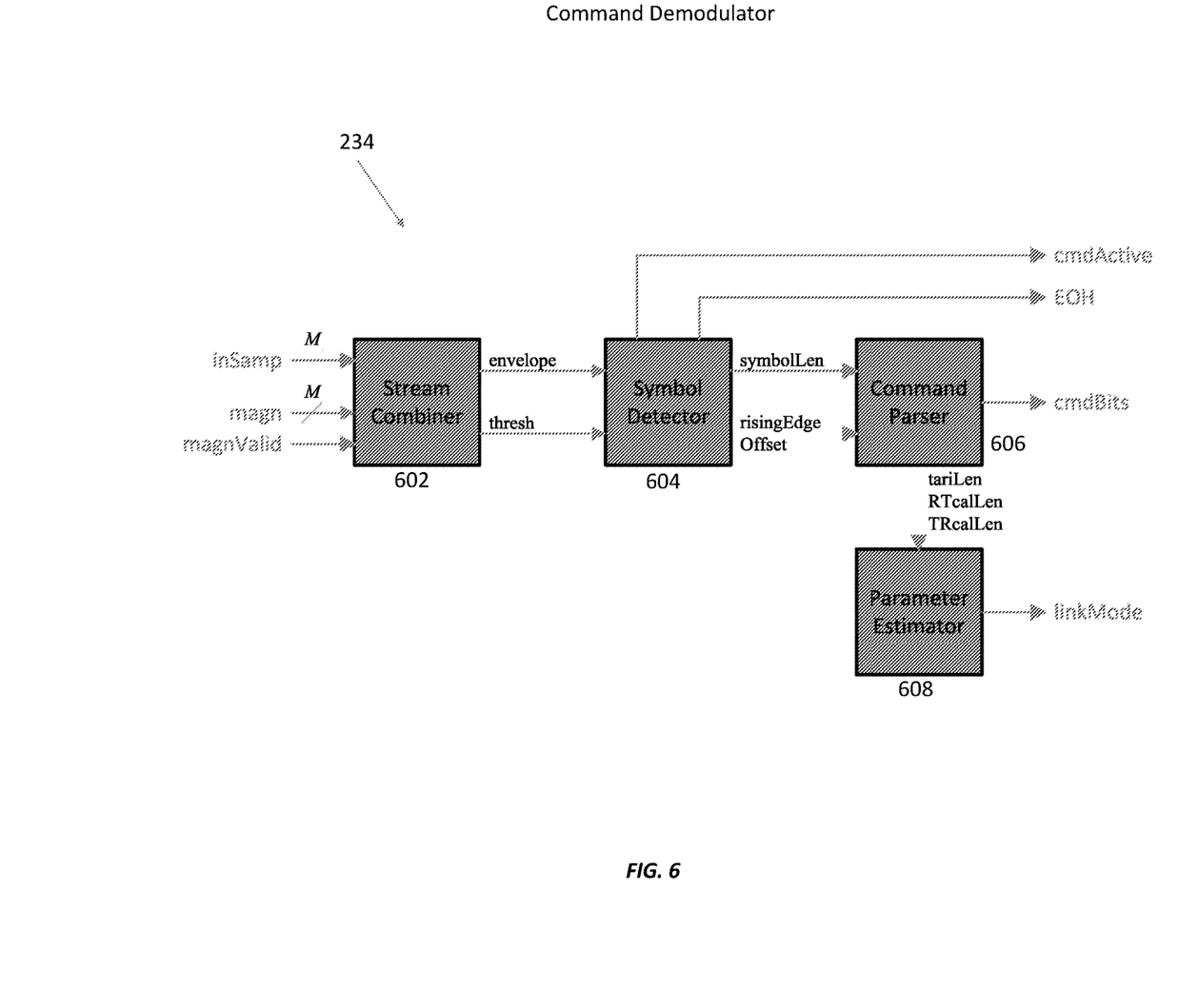
FIG. 6 illustrates a command demodulator in an RFID tag sensor.

FIG. 6 shows an implementation of the command demodulator 234 in the reader 120. The command demodulator 234 is enabled when the reader 120 is in listener mode and disabled otherwise. It includes a stream combiner 602, symbol detector 604, command parser 606, and parameter estimator 608. In operation, the stream combiner 602 combines the M streams from the receiver front end 232 and detects and thresholds the envelope of combined streams, which represent the interrogation signal 121 from another reader 120. The symbol detector 604 detects the length and rising edge of each symbol in the interrogation signal 121 as well as the end of the hop (EOH). The command parser 606 parses the command bits from the symbols in the interrogation signal 121. The command bits tell the reader 120 in listener mode what the reader 120 in interrogator mode told the tag 130 to do, including, for example, what kind of response the tag should send and what modulation and preamble the tag should use. And the parameter estimator 608 operates in listener mode to estimate the backscatter link frequency (BLF), which is a function of the duration of the symbols the reader in interrogator mode used in the command.

Figure 7:
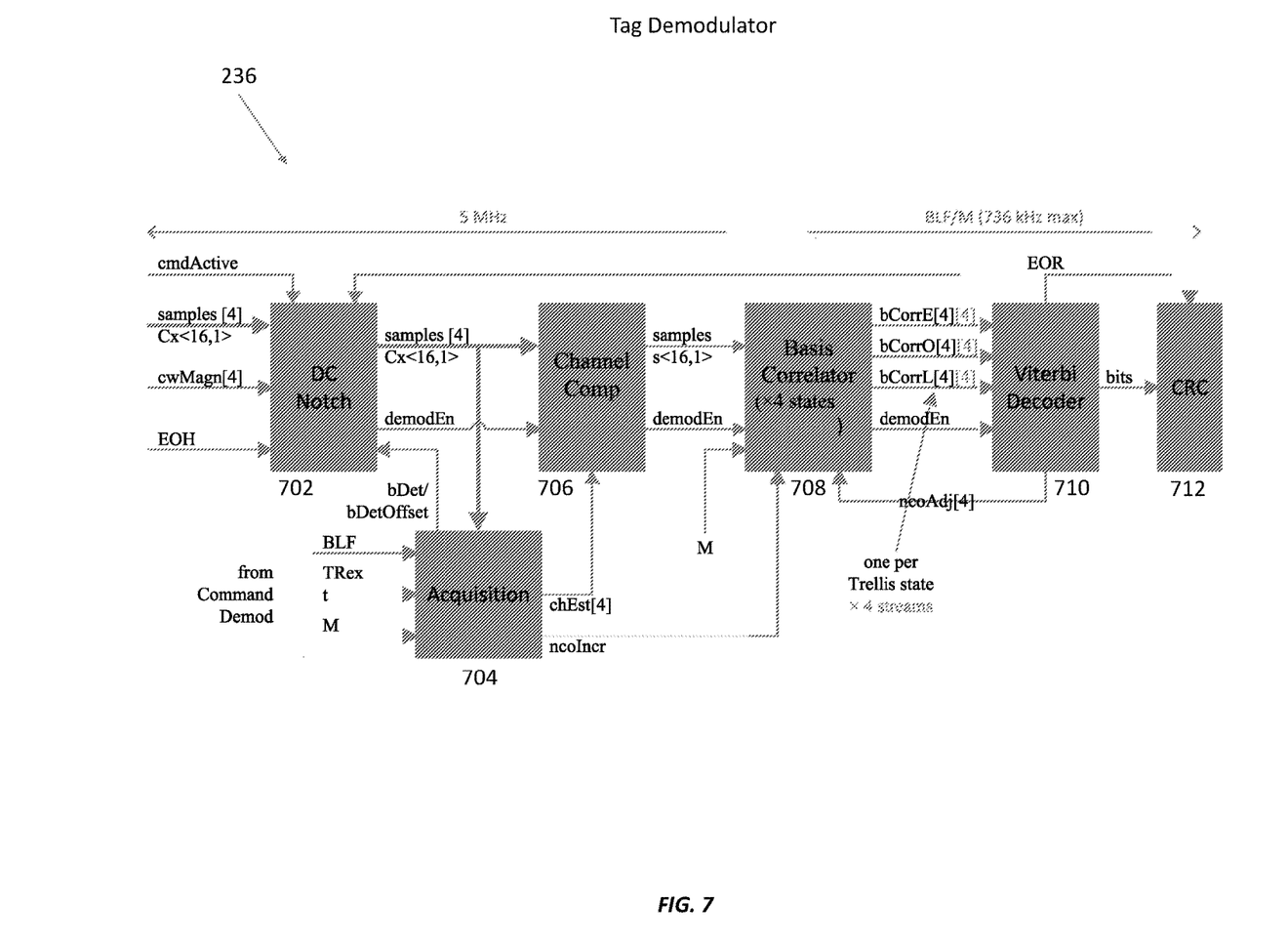
FIG. 7 illustrates a tag demodulator in an RFID tag sensor.

FIG. 7 shows an implementation of the tag reply demodulator 236 in the reader 120. The tag reply demodulator 236 is enabled in both interrogator and listener modes. In interrogator mode, it may be actuated (triggered) by the processor 212 or hop generator 220 in reply to transmission of an interrogation signal by the reader 120. In interrogator mode, it is actuated (triggered) by the command demodulator 234 in reply to detection of an interrogation signal 121 from another reader.

The tag reply demodulator 236 in FIG. 7 includes a direct current (DC) notch filter 702, acquisition module 704, optional channel compensator 706, basis correlator 708, Viterbi decoder 710, and cyclic redundancy check (CRC) module 712. The DC notch filter 702 rejects or attenuates DC power and passes power in the samples of the tag reply from the receiver front end 232 at the sample rate (e.g., 5 MSa/s). The acquisition module 704 correlates the incoming samples against the expected tag preamble to detect if a tag preamble is present, what digital gain level to apply, the exact BLF, and when the first payload sample starts.

The basis correlator 708 correlates the filtered tag reply samples in each stream with different basis states representing the possible states of the payload bits in the tag replies (e.g., four possible basis states, with two for databit-0 and two for databit-1). Put differently, the basis correlator 708 encodes the filtered bit streams using a convolutional or trellis code. The Viterbi decoder 710 or a similar decoder decodes the encoded bit streams using the Viterbi algorithm or another similar algorithm, such as the Fano algorithm. The CRC module 712 detects and corrects errors in the decoded bit stream generated by the Viterbi decoder 710.

Most conventional readers do not have Viterbi decoders because they are close enough to the tags to detect strong tag replies. Using a Viterbi decoder increases the range in listener mode at the cost of increased complexity and latency. After a tag reply, there is a limited time in which to transmit the next command. The lookback memory used by the Viterbi decoder consumes a portion of that limited time, so the transmitter latency is reduced to compensate.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for locating a radio-frequency identification (RFID) tag, the system comprising:
    a plurality of sensors comprising:
        a first sensor configured to emit, in an interrogator mode, a first command and to detect a first reply emitted by the RFID tag in response to the first command; and
        a second sensor configured to detect, in a listener mode, the first command and the first reply; and a controller operably coupled to each sensor in the plurality of sensors and configured to switch the first sensor into the interrogator mode and to estimate a location of the RFID tag relative to the first sensor and the second sensor based on the first reply as detected by the first sensor and as detected by the second sensor.

2. The system of claim 1, wherein each sensor in the plurality of sensors is configured to detect the first reply and the controller is configured to calculate a corresponding angle of arrival of the first reply from the RFID tag to each sensor in the plurality of sensors and to estimate the location of the RFID tag based on the corresponding angles of arrival.

3. The system of claim 1, wherein each sensor in the plurality of sensors is configured to detect the first reply and the controller is configured to calculate a corresponding range from the RFID tag to each sensor in the plurality of sensors and to estimate the location of the RFID tag based on the corresponding ranges.

4. The system of claim 1, wherein the first sensor and the second sensor are mounted on a ceiling, the first sensor is configured to transmit the first command downward, and the second sensor is configured to detect the first command as scattered or reflected by an object below the first sensor.

5. The system of claim 1, wherein the first sensor is configured to emit the first command in a first channel in a plurality of channels and the second sensor is configured to monitor each channel in the plurality of channels and to detect the first reply on the first channel in response to detecting the first command on the first channel.

6. The system of claim 1, wherein the first sensor comprises:
a transmitter to generate the first command; and
a receiver comprising:
a receiver front end to receive the first reply and to receive queries from other sensors in the plurality of sensors;
a first demodulator, operably coupled to the receiver front end, to demodulate to the first reply; and
a second demodulator, operably coupled to the receiver front end, to demodulate commands from the other sensors in the plurality of sensors.

7. The system of claim 6, wherein the transmitter is configured to be switched into an inactive mode when the first sensor is in the listener mode.

8. The system of claim 6, wherein the receiver front end comprises a channel monitor to monitor channels over which the other sensors transmit the commands.

9. The system of claim 8, wherein the channel monitor is configured to monitor 50 channels spanning a band of 40 MHz and having bandwidths of 500 kHz each.

10. The system of claim 6, wherein the first demodulator comprises a Viterbi decoder to decode the first reply.

11. The system of claim 1, wherein the first sensor is a handheld RFID tag reader and the second sensor is mounted on a ceiling.

12. The system of claim 1, wherein the second sensor is configured to emit a second command and to detect a second reply emitted by the RFID tag in response to the second command, the first sensor is configured to detect the second command and the second reply, and the controller is configured further to estimate the location of the RFID tag based on the second reply as detected by the first sensor and as detected by the second sensor.

13. The system of claim 1, wherein the second sensor is configured to detect the first command via a non-line-of-sight (NLOS) path between the first sensor and the second sensor.

14. The system of claim 1, wherein the controller is coupled to each sensor in the plurality of sensors via a wired connection of a wired communications network.

15. The system of claim 14, wherein the wired communications network has a latency greater than a time between transmission of the first command by the first sensor and detection of the first reply by the first sensor.

16. The system of claim 15, wherein the controller is configured to command the first sensor to transmit the first command and to command the second sensor to transmit a second command according to a schedule.

17. The system of claim 15, wherein the first sensor and the second sensor are each configured to determine and transmit at least one of a duration, a frequency, or a received power of the first reply to the controller.

18. The system of claim 15, wherein the first sensor and the second sensor are each configured to transmit at least one of angle of arrival or signature of the first reply to the controller.

19. The system of claim 1, wherein the first sensor and the second sensor are about 5 meters to about 10 meters apart.

20. The system of claim 1, wherein each sensor in the plurality of sensors is switchable between the interrogator mode and the listener mode.

21. The system of claim 20, wherein the controller is configured to switch the sensors in the plurality of sensors between the interrogator mode and the listener mode in a round-robin fashion.

22. The system of claim 20, wherein the first sensor is configured to perform phase estimation in the interrogator mode and to perform phase estimation and frequency estimation in the listener mode.

23. A method of locating a radio-frequency identification (RFID) tag with a first sensor in a first location and a second sensor in a second location different than the first location, the method comprising:
transmitting, by a first sensor, a first command to the RFID tag;
receiving, by the first sensor, a first reply emitted by the RFID tag in response to the first command;
receiving, by the second sensor, the first command and the first reply;
determining, based on the first reply as detected by the first sensor, an angle of arrival and/or a range from the first sensor to the RFID tag;
determining, based on the first reply as detected by the second sensor, an angle of arrival and/or a range from the second sensor to the RFID tag; and
estimating a location of the RFID tag based on the angle of arrival and/or the range from the first sensor to the RFID tag and the angle of arrival and/or the range from the second sensor to the RFID tag.

24. The method of claim 23, further comprising, before the first sensor transmits the first command to the RFID tag:
switching the first sensor into an interrogator mode; and
switching the second sensor into a listener mode.

25. The method of claim 24, wherein switching the first sensor into the interrogator mode and switching the second sensor into the listener mode occurs according to a schedule.

26. The method of claim 24, wherein the first sensor comprises a transmitter, a first demodulator to demodulate to the first reply, and a second demodulator to demodulate commands from other sensors and switching the first sensor into the interrogator mode comprises disabling the second demodulator.

27. The method of claim 24, wherein the second sensor comprises a transmitter, and switching the second sensor into the listener mode comprises disabling the transmitter.

28. The method of claim 24, further comprising:
estimating, by the first sensor, a phase of the first reply as received by the first sensor; and
estimating, by the second sensor, a frequency and a phase of the first reply as received by the second sensor.

29. The method of claim 24, further comprising, after the second sensor receives the first command and the first reply:
switching the first sensor into the listener mode;
switching the second sensor into the interrogator mode;
transmitting, by the second sensor, a second command to the RFID tag;
receiving, by the second sensor, a second reply emitted by the RFID tag in response to the second command; and
receiving, by the first sensor, the second command and the second reply.

30. The method of claim 23, wherein the first sensor and the second sensor are mounted on a ceiling, transmitting the first command comprises transmitting the first command downward from the first sensor, and receiving the first command by the second sensor comprises detecting the first command as scattered or reflected by an object below the first sensor.

31. The method of claim 23, wherein receiving the first command by the second sensor comprises receiving the first command via a non-line-of-sight path from the first sensor to the second sensor.

32. The method of claim 23, wherein transmitting the first command comprises transmitting, by the first sensor, emitting the first command in a first channel in a plurality of channels and further comprising:
monitoring, by the second sensor, each channel in the plurality of channels,
wherein receiving the first reply comprises detecting, by the second sensor, the first command on the first channel.

33. The method of claim 32, wherein monitoring the plurality of channels comprises monitoring 50 channels spanning a band of 40 MHz and having bandwidths of 500 kHz each.

34. The method of claim 23, further comprising:
decoding the first reply with a Viterbi decoder by at least one of the first sensor or the second sensor.

35. The method of claim 23, further comprising:
transmitting, from the first sensor to a controller, an indication of the angle of arrival and/or the range from the first sensor to the RFID tag; and
transmitting, from the second sensor to the controller, an indication of the angle of arrival and/or the range from the second sensor to the RFID tag.

36. The method of claim 35, wherein the first sensor transmits the indication of the angle of arrival and/or the range from the first sensor to the RFID tag to the controller with a latency greater than a time between transmission of the first command by the first sensor and detection of the first reply by the first sensor.

37. The method of claim 23, further comprising:
transmitting, from the first sensor to a controller, an indication of at least one of a duration, a frequency, or a received power of the first reply as received by the first sensor to a controller; and
transmitting, from the second sensor to the controller, an indication of at least one of a duration, a frequency, or a received power of the first reply as received by the second sensor to the controller.

38. A system for locating radio-frequency identification (RFID) tags, the system comprising:
sensors configured to be mounted on a ceiling, to be switched between an interrogator mode in which the sensors transmit commands to the RFID tags and receive replies to the commands from the RFID tags and a listener mode in which the sensors receive and decode the commands from other sensors and the replies from the RFID tags, and to estimate respective angles of arrival of the replies from the RFID tags and/or respective ranges to the RFID tags; and
a controller operably coupled to the sensors and configured to switch the sensors between the interrogator mode and the listener mode and to estimate locations of the RFID tags from the respective angles of arrivals and/or the respective ranges.

39. The system of claim 38, wherein the controller is configured to switch the sensors into the interrogator mode in a round-robin fashion.

* * * * *